United States Patent [19]

Oberoi

[11] Patent Number: 4,867,626
[45] Date of Patent: Sep. 19, 1989

[54] COLLATION ASSEMBLIES

[75] Inventor: Bhushan K. Oberoi, Horley, United Kingdom

[73] Assignee: Redline Roof Tiles Limited, Reigate, United Kingdom

[21] Appl. No.: 122,165

[22] Filed: Nov. 18, 1987

[30] Foreign Application Priority Data

Nov. 19, 1986 [GB] United Kingdom ............... 8627657

[51] Int. Cl.$^4$ ........................................... B65G 57/112
[52] U.S. Cl. .................................. 414/793.7; 414/786;
414/790.8; 198/431; 198/594
[58] Field of Search ................... 414/47, 77, 78, 79,
414/84, 88, 50, 786; 198/425, 431, 588, 594, 626

[56] References Cited

U.S. PATENT DOCUMENTS

| | | | |
|---|---|---|---|
| 2,010,732 | 8/1935 | Mandusic | 414/79 X |
| 3,131,819 | 5/1964 | Ducayet | 414/47 |
| 3,761,080 | 9/1973 | Larson | 414/79 X |
| 4,194,343 | 3/1980 | Myers | 414/79 X |
| 4,712,361 | 12/1987 | Oberoi | 414/79 X |

FOREIGN PATENT DOCUMENTS

| | | | |
|---|---|---|---|
| 24052 | 11/1921 | France | 414/50 |
| 54296 | 2/1967 | German Democratic Rep. | 414/79 |
| 383594 | 8/1973 | U.S.S.R. | 414/79 |

Primary Examiner—Leslie J. Paperner
Attorney, Agent, or Firm—Beveridge, DeGrandi & Weilacher

[57] ABSTRACT

The invention relates to apparatus for collating and stacking building components, such as roof tiles. The apparatus comprises pairs of shelves for receiving and supporting tiles which are fed into the shelves continuously by means of a conveyor arrangement. The shelves are moved downwards towards a stack support positioned beneath the shelves. As a pair of shelves becomes the lowermost pair, the two shelves move apart releasing the tile carried thereon onto the stack support to form part of a stack. When the stack is complete, the stack support is removed and the number of shelves between the uppermost and lowermost shelf increased to enable a predetermined number of tiles to be stored in the shelves while the stack support is being replaced.

18 Claims, 8 Drawing Sheets

COLLATION ASSEMBLIES

This invention is concerned with improvements in or relating to collation assemblies, that is apparatus for the collation and stacking of manufactured building components. The invention is particularly, although not exclusively, concerned with improvements in collation assemblies for use with a concrete roof tile manufacturing plant.

The important steps in the process of concrete roof tile manufacture are the formation of tiles on metal pallets, curing the mortar, depalleting the cured tiles and the packaging of the end product. The main use of collation assemblies is for creating stacks of cured tiles ready for packaging.

In their passage to and through collation assemblies the tiles may be subjected to shock loads due to the sudden stop-start conditions under which known collation assemblies have operated. Under such conditions the tiles may suffer damage. Such damage may be obvious from visual inspection, which will enable the damaged tiles to be removed before the tiles are packaged.

However, often the resulting damage is in the form of hairline cracks, not visible to the human eye, which only become evident when due to handling or exposure to inclement weather conditions in use, they lead to corners breaking off tiles. This obviously leads to loss of goodwill between the manufacturer and end-user.

It is therefore an object of this invention to provide an improved collation assembly suitable for use in a tile plant wherein the shock loading on tiles fed to and through the assembly is reduced to a minimum and that the stacking of tiles may be accomplished at high speed, i.e. up to 200 tiles per minute in an operation which avoids raising fluctuating stresses in the machine components.

According to the present invention there is provided apparatus for collating and stacking manufactured building components, comprising a plurality of pairs of shelves in a generally vertical array, being downwardly movable, conveyor means for feeding components to shelves other than a lowermost pair of shelves, means for locating the components on the shelves, the opposed edges of each component being supported by a pair of shelves, means for causing the lowermost pair of shelves in use supporting a component to move apart to release the component located thereon, such that it is placed on support means capable of supporting a stack of components, or on top of components already stacked on the support means, means for moving the empty shelves so that an adjacent pair of shelves becomes the lowermost pair in use, and means for varying the number of shelves in use between an uppermost shelf and the lowermost shelf supporting a component, to enable a predetermined number of components to be stored in the shelves before being released onto the support means.

Preferably one of each pair of shelves is mounted on a first chain and the second shelf of each pair mounted on a second chain, said shelves being parallel and spaced apart on their respective chains, said chains being simultaneously drivable to move the shelves downwards and means being provided for increasing and decreasing the number of pairs of shelves in use by altering the height of the lowermost pair.

The means for altering the height of the lowermost shelves preferably comprise a plurality of sprockets and wheels supporting each chain, such that a least one adjustable wheel and sprocket combination are moveable together upwards and downwards for each chain, such that the number of shelves in use are those mounted on the length of chain running between an upper fixed sprocket and the adjustable wheel.

The lowermost pair of shelves are moved apart, releasing the component located thereon, as the chains on which they are mounted pass about said wheels and tilt downwards and outwards away from one another thereby creating a wider space between the pair of shelves thus allowing the release of the component.

The support means is moveable upwards and downwards such that the surface of the support means, if empty, or the top of the stack of components on the support means is just below the level of the component held in the lowermost pair of shelves.

The support means is movable to transfer a stack of components between a first position beneath the shelves and a second position remote from the shelves, the movement of the support means being synchronised with the movement of the shelves such that when the support means is not in a position to receive components the means for altering the height of the lowermost pair of shelves operates such that the wheel and adjuster sprocket mechanisms move downwards, increasing the length of chain between the upper fixed sprocket and the adjustable wheel and also therefore the number of shelves in use, said means moving at a speed which prevents the lowermost pair of shelves holding a component from passing around the adjustable wheel, thus allowing more components to be fed into the shelves, but not allowing those already located on shelves to be released.

When the support means has been moved into a position to receive components, the adjustable wheel and sprocket arrangement move upwards, decreasing the number of shelves in use and allowing components to be released from the lowermost shelf to form a stack on said support means.

Preferably the stack of components is moved from the first position beneath the shelves when the number of components stacked on the support means reaches a predetermined number.

Preferably the support means is a support table mounted on a carriage movable between the receiving position, aligned beneath the shelves and a second position remote from the shelves.

It is also preferred that two support tables are mounted on two carriages which are movable such that as one carriage moves a stack of components from the first position in a receiving mode to the second position, the second carriage moves an empty support table from the second to the first position.

The support means may be a conveyor operable to move a stack of components from a first position beneath the shelves to a position remote from the shelves, such that an empty portion of the conveyor moves to the first position to receive a stack of components.

The invention is particularly applicable where the building components are concrete roof tiles.

The invention also provides for a method of stacking building components using the apparatus as herebefore described.

A preferred embodiment of a collation assembly according to the invention will now be described, by way of example, with reference to the accompanying drawings, in which.

Figure 1:
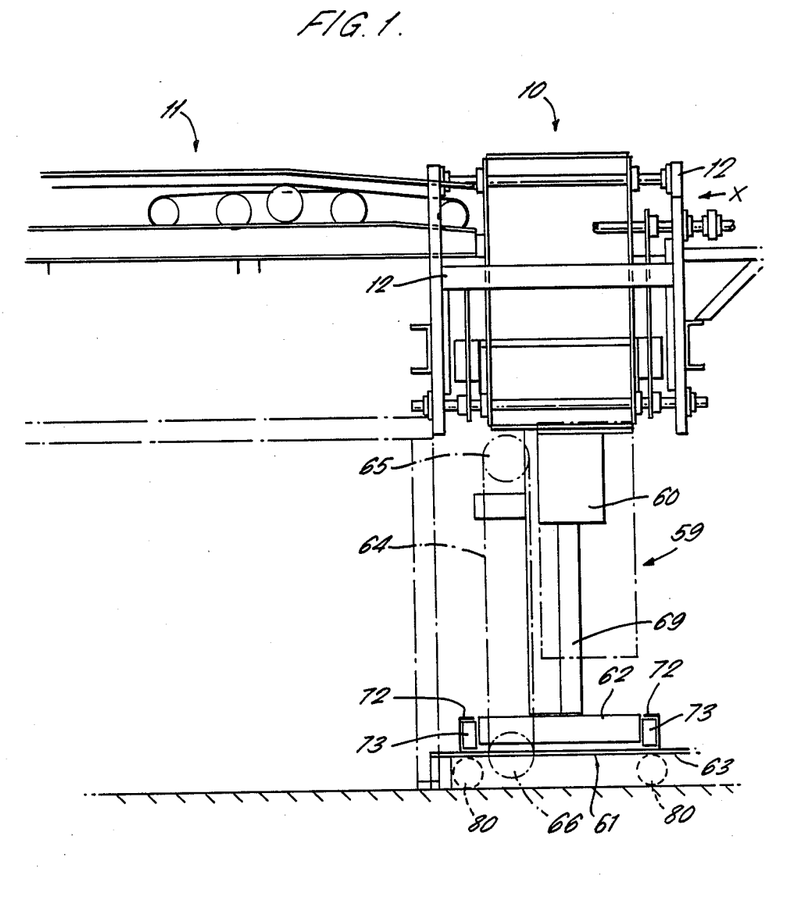
FIG. 1 is a side elevation of a tile feeding arrangement feeding tiles to a collation assembly, with certain parts omitted for clarity.

Referring first to FIG. 1, concrete roof tiles T are fed seriatim to a collation assembly 10 by a tile feeding arrangement 11, in a regular spaced flow. The tiles are formed into successive stacks by the assembly 10 before they are transferred to other apparatus within a tile manufacturing plant.

The collation assembly 10 is supported by a floor mounted fabricated main frame 12.

The feeding arrangement 11 is a conveyor having means, not shown, for spacing tiles T. The conveyor may be a belt or polycord conveyor.

Figure 2:
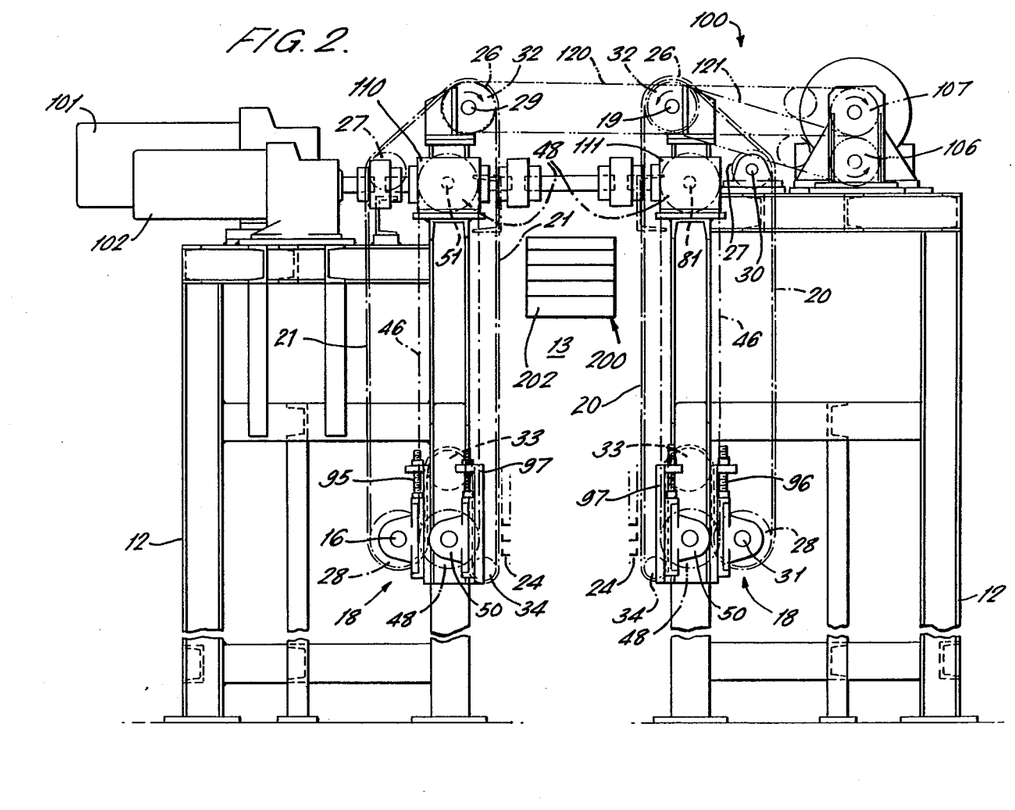
FIG. 2 is a front elevation of the collation assembly of FIG. 1 viewed in the direction of arrow X on FIG. 1.
Figure 8:
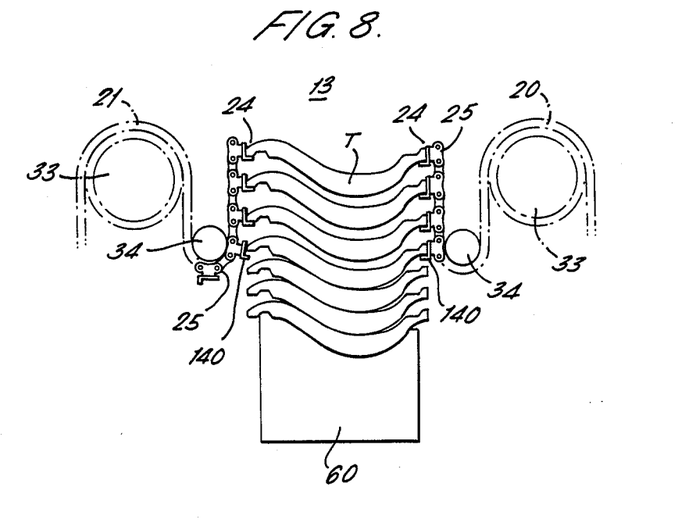
FIG. 8 is a schematic representation of a part of a chain and shelf arrangement showing how stacks of tiles are made.

The collation assembly 10 is a single combined racking and stripping device comprising two pairs of endless chains 20, 21 shown in four single-chain dot lines in FIG. 2, on the links 25 of which are mounted "L" shaped shelves 24, see FIG. 8, which form a magazine 13. The shelves 24 are mounted between the two members of each pair of chains 20, 21 and the pairs of chains 20, 21 are spaced such that a tile T may be supported at it edges by a pair of opposing shelves 24, one of which is mounted on each pair of chains 20, 21.

Figure 5:
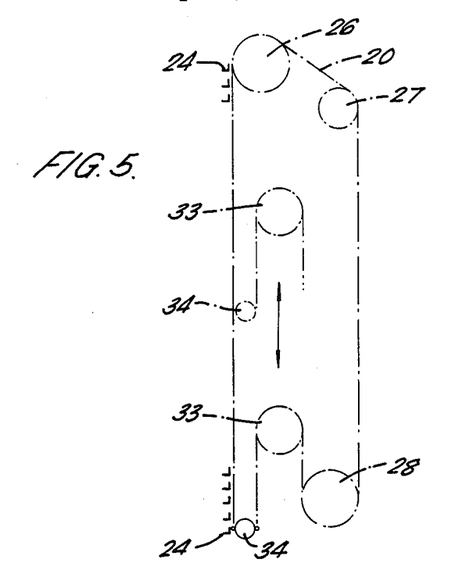
FIG. 5 is a schematic representation of the path of one of the chains of the collation assembly of FIG. 1.
Figure 6:
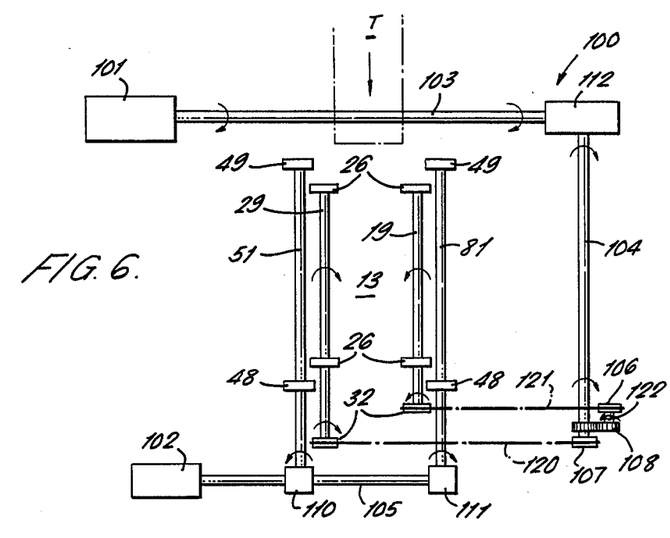
FIG. 6 is a schematic representation of the driving arrangement of the collation assembly of FIG. 1.

The pairs of chains 20, 21 are arranged about a series of sprockets 26, 27, 28, 33 and wheels 34, see FIG. 5. The sprockets 26, are fixedly mounted on each of shafts 19 and 29, and a pair of sprockets 27 on each of shafts 30 and 17, see FIG. 3, and the further pair of sprockets 28 on each of shafts 31 and 16, see FIG. 2. The shafts 16, 17, 19, 28, 30 and 31 are rotatably mounted on the main frame 12 in conventional bearing blocks, not shown, fixed thereto. Sprockets 32, see FIG. 6, are also mounted on shafts 19 and 29 and provide the means for driving the chains 20, 21.

Tensioning means 95, 96, see FIG. 2, are associated with the bearing blocks, not shown, supporting shafts 16, 31 to allow adjustment of chains 21, 20.

When the assembly 10 is in use, the pairs of chains 20, 21 are driven such that the pairs of opposing shelves 24 on the inner run of magazine 13 move downwards.

Figure 4:
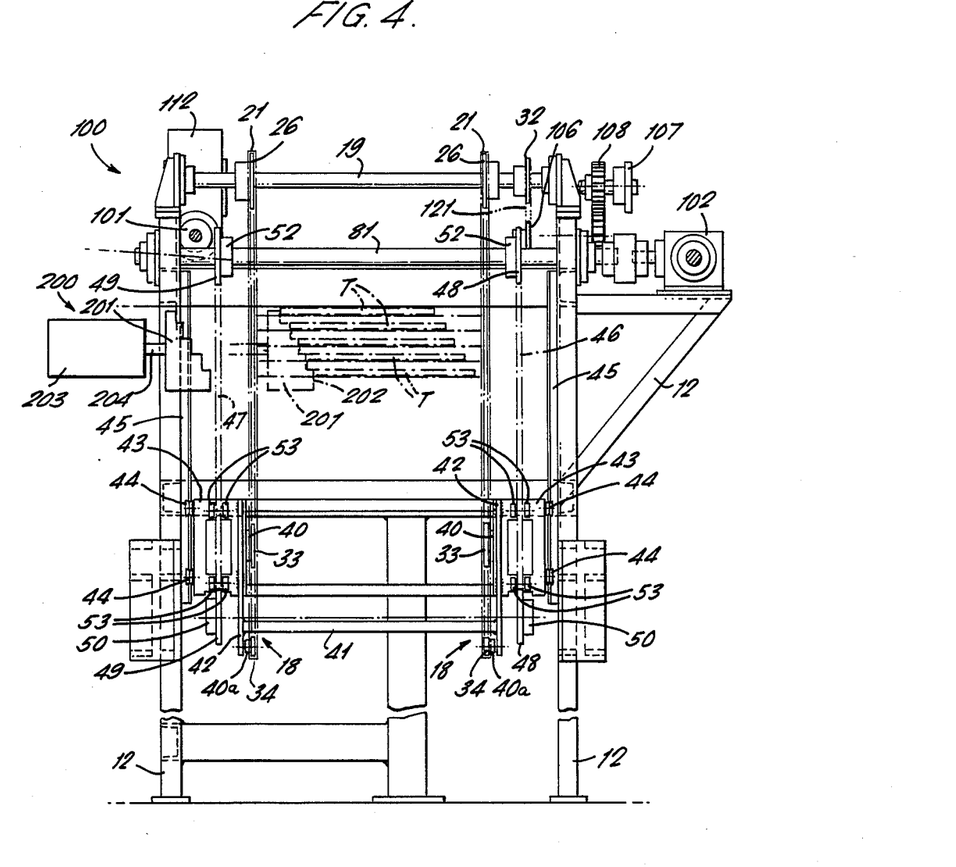
FIG. 4 is a side elevation of the collation assembly of FIG. 1 with the motors omitted for clarity.

The chains 20, 21 also pass around a stripper assembly 18 comprising an adjuster sprocket 33 and wheel 34 combination for each chain 20 and 21, see FIGS. 2, 4 and 5.

Referring to FIG. 4, the adjuster sprockets 33 and wheels 34 are rotatably mounted on brackets 40 and 40A respectively which are fixed to side plates 42. A horizontal cross bar 41 is welded between side plates 42 to keep them a fixed distance apart, and side plates 42 are welded to backing plate 43. The adjuster sprockets 33 and wheels 34 are thus constrained to move together with a fixed spacing between them.

Standard journal assemblies 44 are fixed on either side of plates 43 and run on slides 45 fixedly mounted on the main frame 12. This allows the whole stripper assembly 18 to move upwards or downwards in a fixed path.

This movement is effected by a further chain 46, 47 and sprocket 48, 49 arrangement. For each side of the magazine 13, the arrangement is essentially identical. Therefore only one will be described.

Referring to FIG. 4, a pair of chains 46 and 47 shown in four single-chain dot lines are supported on pairs of sprockets 48, 49, the lower member of each pair being rotatably fixed to the main frame 12 by means of bearing blocks 50. The upper member of each pair of sprockets 48, 49 is mounted on a shaft 51, 81 which is fixed to the main frame 12 by standard bearing blocks 52. The backing plates 43 are mounted on the links of one side of the chains 46, 47 by means of pairs of brackets 53, such that as the shaft 51 is driven in a particular direction, the stripper assembly 18 moves in a vertical path.

Tensioning means 97, see FIG. 2 are associated with brackets 50 to allow adjustments of the chains 46.

Figure 3:
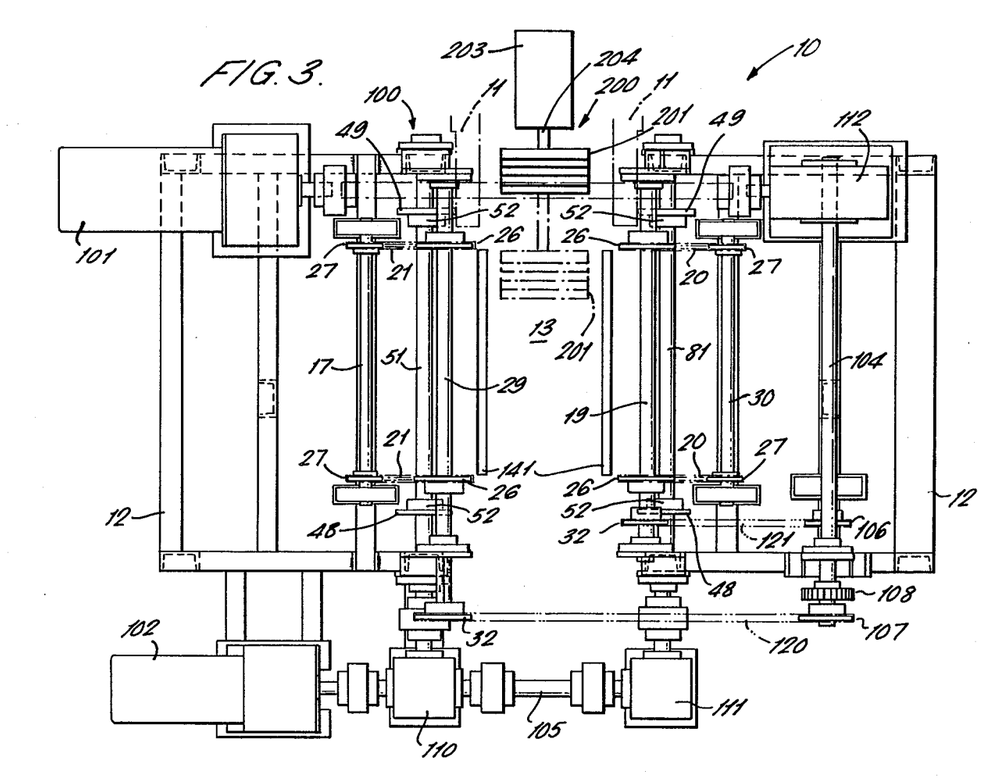
FIG. 3 is a plan view of the collation assembly of FIG. 1 with the stripper mechanism omitted for clarity.

A reciprocating pusher arm 200 is mounted on frame 12, beneath the tile feeding arrangement 11 adjacent collation assembly 10, see FIGS. 2, 3, 4. The pusher arm 200 has a stepped profile 201, comprising at least one step 202 and preferably five, and is mounted on frame 12 by means of a piston 204 and cylinder 203 arrangement. The piston 204 may be activated hydraulically or by other suitable means to move the arm 200 between a retracted position remote from magazine 13 and an extended position, between the pairs of shelves 24 as shown in FIGS. 3 and 4.

Figure 7:
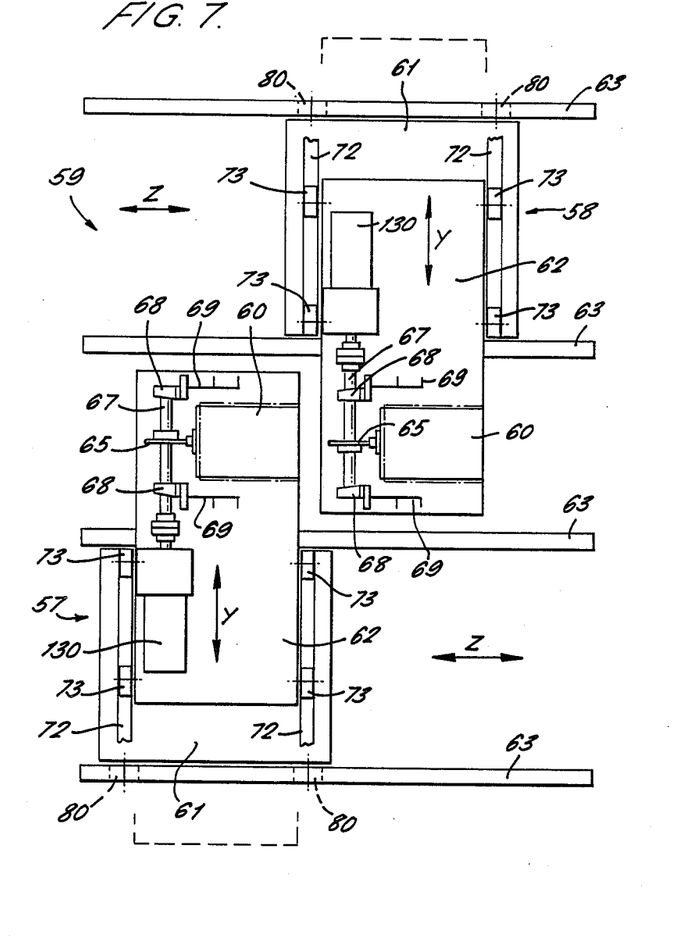
FIG. 7 is a plan view of a support table and trolley arrangement.

Positioned beneath the magazine 13 is a support table assembly 59 comprising a pair of support units 57, 58 which each comprise a table 60 mounted on a shuttle unit 62 which in turn is mounted on a trolley 61, see FIGS. 1 and 7. The pair of support units 57, 58 are essentially the same and therefore only one unit 57 will be described.

The table 60 is fixedly mounted on a chain 64 which is supported between a pair of sprockets 65, 66. The upper of the pair of sprockets 65 is mounted on shaft 67 which is rotatably mounted on the shuttle unit 62 by vertical supports 69 and bearing blocks 68. As the shaft 67 is driven by motor 130, the table 60 moves vertically upwards or downwards.

The upper surface of the table 60 is shaped to receive tiles T and is interchangeable to suit the various tile contours to be received thereby.

The shuttle units 62 are mounted on wheels 73 which run on rails 72 which are mounted on the trolley 61. This allows the shuttle units 62 to move in the direction of arrow Y in FIG. 7 between two positions; a first position, in which the table 60 is positioned beneath the magazine 13 and a second position to the side of the collation assembly 10 shown in dotted lines on FIG. 7. The trolley 61 is also mounted on wheels 80 which run inside "C" shaped rails 63 fixed to the floor so that the support units 57, 58 may be moved in the direction of arrow Z to a further piece of apparatus remote from the collator assembly 10.

The support table assembly 59 further comprises a programmable detector, not shown, which counts the number of tiles T accumulating on the support table 60 and controls the motor 130, and therefore the movement of the table 60, so that table 60 is positioned with the top of the stack of tiles T or the top of the empty table 60 just beneath the lowermost shelves 140 of the magazine 13, see FIG. 8. This means that if no tile T has been released, as an empty pair of shelves pass through the magazine 13, the height of the support table 60 remains constant. As soon as the number of tiles T in the stack reaches a preset number, the detector sends a signal to the motor 130 to cause it to accelerate to drop the table 60 rapidly.

Further electronically controlled drive means, not shown, control the movement of the shuttle unit 62 and trolleys 61, which are synchronised with each other.

The drive means 100 for magazine 13 of assembly 10 is linked with the feed assembly 11 to provide simultaneous movement of the two assemblies. FIG. 6 shows a schematic layout of the drive arrangement.

The drive means of assembly 10 comprise two motor and gear box arrangements 101, 102, further gear boxes 110, 111, 112, output shafts 19, 29, 51, 81, 103, 104, 105, which support sprockets 26, 32, 48, 49, 106, 107 and gear 108, and endless chains 120, 121, see FIGS. 3 and 6.

Figure 9:
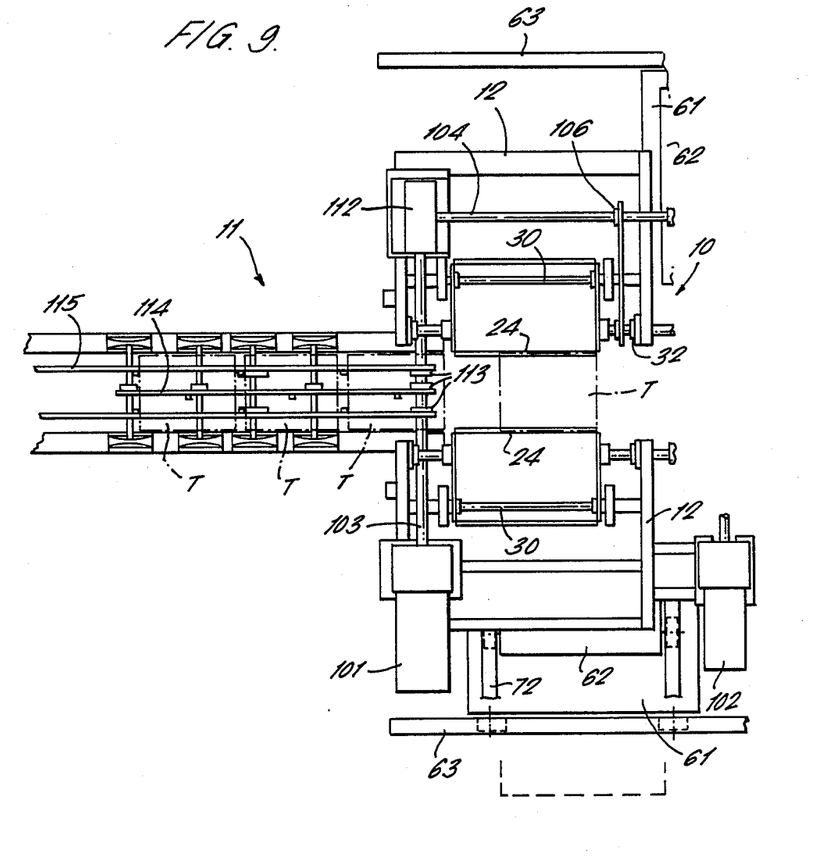
FIG. 9 is a plan view of the tile feeding arrangement and collation assembly of FIG. 1, with certain parts omitted for clarity.

The motor 101, see FIG. 6, drives its output shaft 103 in a fixed direction at a constant speed. Mounted on this shaft 103 are the drive sprockets 113 of the conveyors 114, 115 of the tile feeding assembly 11, see FIG. 9. Shaft 103 is connected at the opposite end to the motor 101 to a gear box 112 which has an output shaft 104 connected thereto at an angle of 90° to its input shaft 103. Fixedly mounted on shaft 104 is sprocket 107 which supports an endless chain 120, thus connecting sprocket 107 with sprocket 32 on shaft 29. When motor 101 is activated, shaft 29 and chain 21 are driven such that the shelves 24 on the inner run of the chain 21 move downwards. Sprocket 106 is connected with sprocket 32, fixedly mounted on shaft 19, by chain 121. Sprocket 106 is driven as spur gear 108 drives a short splined shaft 122, whilst the gear 108 is driven by splines on the end of rotating shaft 104 furthest from gearbox 112. Thus the motor 101 drives shaft 19 and chain 20 causing the shelves 24 on the inner rung of chain 20 also to move downwards in synchronisation with those on chain 21.

The stripper assembly 18 is driven by a motor and gear box arrangement 102. The output shaft 105 of the motor passes through gear boxes 110 and into 111. Connected to the gear boxes 110 and 111 are output shafts 51 and 81, at an angle of 90° to shaft 105 on which are mounted pairs of sprockets 48, 49, which drive the pairs of chains 46 and 47 which cause the stripper assembly 18 to move upwards or downwards.

All the motor drives are electronically controlled and synchronised, and are mounted on the mainframe 12 by conventional means.

In an alternative arrangement the mechanical linkages may be replaced by any other synchronising means.

The operation of the collation assembly 10 is such that tiles T are fed from the tile feeding mechanism 11 in regular gapped intervals into the uppermost pair of shelves 141 of the magazine 13 which are level with the end of the tile feeder 11. As the tiles are fed into the shelves 24, friction forces between the tile T and shelves 24 bring the tiles T to rest. The pusher arm 200 locates the tiles T in the required place on the shelves 24. When the arm 200 is activated it moves from its retracted to its extended position engaging with its stepped profile 201 one edge of the tiles T in five adjacent shelves 24, thus moving the tiles T to corresponding staggered positions along the shelves 24 see FIG. 4. The arm 200 is reactivated and withdrawn to its retracted position and the shelves 24 moved downwards and stop so that as the next tile T reaches the assembly 10 the next pair of empty shelves 24 is aligned with the tile feeder 11. As the shelves 24 stop, the pusher arm 200 is again activated to move to its extended position to engage with tiles T. The tiles T are moved downwards by the collator, a distance equivalent to a complete step 202 of the pusher arm 200. The tiles T which are still engaged by the pusher arm 200 are moved further along the shelves 24 than the previous time. The tiles T moved into position by the lowermost step 202 of arm 200 are correctly aligned for stacking.

There are two distinct modes of operation of the stripper assembly 18.

The first mode occurs when a support table 60 of support unit 58 is in position beneath the magazine 13. Referring to FIG. 8, as the chains 20, 21 pass around wheels 34, the lowermost pair of shelves 140 holding a tile T tilt downwards and outwards releasing the tile T onto the table 60 or a stack of tiles T already on the table 60. The stripper assembly 18 moves upwards and the table 60 simultaneously moves downwards such that the level of the top of the stack of tiles T is just below the next lowermost pair of shelves 140. When the stack of tiles T reaches the programmed number the table 60 drops down and the shuttle 62 moves outwards in the Y direction from underneath the magazine 13 on its rails 72. The second support unit 57 which is positioned behind unit 58 is then activated so that the trolley 61 moves on its rails 63 in the Z direction until the support table 60 of the unit 59 is aligned beneath the magazine. The trolley 61 of the first support unit 58 moves along rails 63 in direction Z to a further station of the tile manufacturing plant where the stack of tiles T is removed from the table 60. The trolley 61 then moves back along rails 63 to a position behind the unit 57 and the shuttle 62 moves inwards in the Y direction. When the second support unit 57 holds a full stack of tiles T it is moved outwards, and the process repeated.

Whilst the table 60 are being changed over the stripper assembly 18 enters its second mode of operation. The motor 102 reverses direction such that the chains 46, 47 are driven in the opposite direction and the stripper assembly 18 moves downwards. In this manner the effective number of pairs of shelves 24 between the lowermost pair of shelves 140 and the uppermost pair 141 increases, whereas in the first mode of operation it was decreasing as the stripper assembly 18 moved upwards. The speed of the downward movement of the stripper assembly 18 is such that the wheels 34 move at the same speed as the shelves 24 or faster, thus preventing the lowermost pair of shelves 140 from passing around the wheels 34 releasing the tile T supported thereon.

By the time the stripper assembly 18 reaches its lowest point, the empty table 60 is in position to receive tiles T and the motor 102 again reverses direction to cause the assembly 18 to move upwards again.

An alternative embodiment of the invention provides a collation assembly 10 in which the shelves 24 are driven downwards, the table 60 remains stationary until it is full and the stripper assembly 18 first moves upwards and then downwards whilst the table is moved to said further station where the stack of tiles is removed.

A third embodiment provides an assembly 10 in which the shelves 24 are driven downwards, the table 60 moves downwards as the stack of tiles T builds up, and the stripper assembly 18 remains stationary until the tables 60 need to be changed at which point assembly 18 first moves upwards and then downwards to decrease or increase the number of shelves 24 in use.

The choice between the three alternative arrangements is dependent on the number of tiles required in the stack and the thickness of the tiles.

A further embodiment comprises separate drive means for the chains 20, 21 and the tile feeding mechanism 11, which are electronically controlled and synchronised.

The two tables 60 as herein described may be replaced in a further modified arrangement by just one such table which is simply emptied between the formation of successive stacks thereon.

Thus the process of collating tiles may be performed in one continuous operation, the apparatus being capable of effectively storing tiles whilst more are being fed in.

The motor drives have a base speed reference which may be set to a nominal tile making rate. The apparatus is capable of stacking up to 200 tiles per minute, but may be set to the manufacturers specification so that it is synchronised with other apparatus that may precede or follow the collation assembly in a tile manufacturing plant.

At certain operating speeds, the apparatus may also be adjusted to operate under indexing conditions rather than continuously.

Other advantages of the present invention are that gaps in the flow of tiles T, due to a blockage, say further down stream may pass through the systems with no ill-effects. The stack size is fixed and programmed by the manufacturer and will always remain constant regardless of whether tiles are being fed constantly to the collator or not.

In a further arrangement, the collation assembly 10 may be fed from a rising or descending conveyor in which a magazine of components is formed in known manner with components being transferred to the collator 10 by one or more strokes of a pusher arm or the like. The collator 10 is thereafter progressed relative to the table 60 until the stack of components is formed thereon. The number of shelves 24 in use may be set to a predetermined number, which is not necessarily the same number as those in the magazine, which may require a number of pusher arm strokes to empty. Thus the first components may be stored in the shelves which move down to line up empty shelves with the following full magazine and whilst further components are fed into the shelves.

Alternatively, the collation assembly 10 may be fed from a split level feed conveyor assembly (not shown) which feeds alternate tiles to shelves at an upper and a lower position. In this embodiment the collator shelves 24 may be filled at a greater speed than when a single conveyor is used.

In an alternative embodiment of the invention, table 60 may be replaced by a conveyor support. Such a conveyor support (not shown) may comprise a belt or polychord arrangement and is capable of upwards and downwards movement relative to shelves 24. When a stack of tiles has been deposited on the conveyor support at one end thereof, the conveyor is activated to transport the stack to a subsequent processing station of the plant whilst bringing an empty portion of the conveyor into alignment beneath the shelves 24 for receiving tiles. This arrangement replaces shuttle units 62. A conveyor arrangement is preferably used where smaller stacks are required.

In another embodiment of the invention, the gear boxes 110, 111, 112 may be replaced by cam boxes.

I claim:

1. Apparatus for collating and stacking manufactured building components having opposed edges, comprising a plurality of pairs of shelves in a generally vertical array, being downwardly movable, conveyor means for feeding components to said shelves other than a lowermost pair of shelves, means for locating the components on the shelves, the opposed edges of each component being supported by a pair of shelves, means for causing a lowermost pair of shelves in use supporting a component to move apart to release the component located thereon, such that it is placed on support means capable of supporting a stack of components, or on top of components already stacked on the support means, means for moving the empty shelves so that an adjacent pair of shelves becomes the lowermost pair in use, and means for varying the numbers of pair of shelves in use between an uppermost pair of shelves and the lowermost pair of shelves supporting a component, to enable a predetermined number of components to be stored in the shelves before being released onto the support means.

2. Apparatus as claimed in claim 1 in which one of each pair of shelves is mounted on a first chain and the second shelf of each pair is mounted on a second chain, said shelves being parallel and spaced apart on their respective chains, said chains being simultaneously drivable to move the shelves downwards and means being provided for increasing and decreasing the number of pairs of shelves in use by altering the height of the lowermost pair.

3. Apparatus as claimed in claim 2, in which the means for altering the height of the lowermost shelves comprise a plurality of sprockets and wheels supporting each chain, such that at least one adjustable wheel and sprocket combination are movable together upwards and downwards for each chain, such that the number of shelves in use are those mounted on the length of chain running between an upper fixed sprocket and the adjustable wheel.

4. Apparatus as claimed in claim 3 in which the lowermost pair of shelves are moved apart, releasing the component located thereon, as the chains on which they are mounted pass about said wheels and tilt downwards and outwards away from one another thereby creating a wider space between the pair of shelves thus allowing the release of the component.

5. Apparatus as claimed in claim 1 in which the support means is movable upwards and downwards such that the surface of the support means, if empty, or the top of the stack of components on the support means is just below the level of the component held in the lowermost pair of shelves.

6. Apparatus as claimed in claim 3 in which the support means is movable to transfer a stack of components between a first position beneath the shelves and a second position remote from the shelves, the movement of the support means being synchronised with the movement of the shelves such that when the support means is not in a position to receive components the means for altering the height of the lowermost pair of shelves operates such that the wheel and adjuster sprocket mechanisms move downwards, increasing the length of chain between the upper fixed sprocket and the adjustable wheel and also therefore the number of shelves in use, said means moving at a speed which prevents the lowermost pair of shelves holding a component from passing around the adjustable wheel, thus allowing more components to be fed into the shelves, but not allowing those already located on shelves to be released.

7. Apparatus as claimed in claim 5 in which when the support means has been moved into a position to receive components, the adjustable wheel and sprocket arrangement move upwards, decreasing the number of shelves in use and allowing components to be released from the lowermost shelf to form a stack on said support means.

8. Apparatus as claimed in claim 6 in which the stack of components is moved from the first position beneath the shelves when the number of components stacked on the support means reaches a predetermined number.

9. Apparatus as claimed in claim 1 in which the support means is a support table mounted on a carriage movable between a first receiving position, aligned beneath the shelves and a second position remote from the shelves.

10. Apparatus as claimed in claim 9 in which two support tables are mounted on two carriages which are movable such that as one carriage moves a stack of components from the first position in a receiving mode to the second position, the second carriage moves an empty support table from the second to the first position.

11. Apparatus as claimed claim 1 in which the support means is a conveyor operable to move a stack of components from a first position beneath the shelves to a position remote from the shelves, such that an empty portion of the conveyor moves to the first position to receive a stack of components.

12. Apparatus as claimed claim 1 in which the building components are concrete roof tiles.

13. A method of stacking building components using the apparatus as claimed in claim 1 of the preceding claims.

14. Apparatus for collating and stacking manufactured building components having opposed edges, comprising a plurality of pairs of shelves in a generally vertical array, conveyor means for feeding components to said shelves, means for locating the components on the shelves, the opposed edges of each component being supported by a pair of shelves, means for causing a lowermost pair of shelves in use supporting a component to move apart to release the component located thereon, support means capable of supporting a stack of released components, means for moving the empty shelves so that an adjacent pair of shelves becomes the lowermost pair in use, and means for varying the numbers of pair of shelves in use between an uppermost pair of shelves and the lowermost pair of shelves supporting a component, and one of each pair of shelves being mounted on a first pair of chains and the second of each pair of shelves being mounted on a second pair of chains, said shelves being parallel and spaced apart on their respective chains, said chains being simultaneously drivable to move the shelves downward and means being provided for increasing and decreasing the number of pairs of shelves in use by altering the height of the lowermost pair, said means for altering the height of the lowermost shelves comprising a plurality of sprockets and wheels supporting each chain, such that at least one adjustable wheel and sprocket combination are movable together upwards and downward for each chain, such that the number of shelves in use are those mounted on the length of chain running between an upper fixed sprocket and the adjustable wheel, and the lowermost pair of shelves operates such that the wheel and adjuster sprocket mechanisms move downward to increase the length of chain between the upper fixed sprocket and the adjustable wheel and also therefore the number of shelves in use, said means moving at a speed which prevents the lowermost pair of shelves holding a component from passing around the adjustable wheel, thus allowing more components to be fed into the shelves, but not allowing those already located on shelves to be released.

15. Apparatus for collating and stacking components, comprising:
a first series of shelves;
a second series of shelves;
first shelf supporting means for supporting said first series of shelves, said first shelf supporting means including a variable vertical section which supports a plurality of said first series of shelves in a generally vertical array;
second shelf supporting means for supporting said second series of shelves, said second shelf supporting means including a variable vertical section which supports a plurality of said second series of shelves in a generally vertical array such that respective pairs of shelves of said first and second series of shelves are positioned essentially at the same height in the vertical array of each of said first and second shelf supporting means and in mirror image to one another;
means for feeding components to said respective pairs of shelves such that opposed edges of each component are supported by said respective pairs of shelves;
means for moving said first and second shelf supporting means such that said respective pairs of shelves positioned along said variable vertical sections move downwardly and the components being supported by said respective pair of shelves remain essentially parallel to one another;
separating means for causing the lowermost respective pair of shelves to move apart from one another out of the variable vertical section along which each one of said respective pairs of shelves is supported, and said separating means providing means for releasing the component supported by the lowermost respective pair of shelves as each shelf of said respective pair of shelves moves apart;
means positioned below said lowermost respective pair of shelves for receiving, in supportive fashion, the component being released;
varying means for varying the length of the variable vertical section of both said first and second series of shelves and to thus vary the total number of shelves positioned along each variable vertical section.

16. Apparatus as claimed in claim 15 wherein at the time said separating means is moving apart the lowermost respective pair of shelves, said means for moving said first and second shelf supporting means causes a shelf of said first series of shelves and a shelf of said second series of shelves to move together and form an uppermost one of said respective pairs of shelves positioned along said vertical sections and said varying means varies the height of the position of the lowermost respective pair of shelves while maintaining constant the height of the position of the uppermost respective pair of shelves.

17. Apparatus as claimed in claim 16 wherein said varying means is adapted to increase the length of said vertical sections at a rate which is greater than or equal to the rate of downward movement of said respective pairs of shelves.

18. A method of stacking components comprising:
   (a) utilizing a plurality of shelves supported on a first shelf supporting means with some of said shelves being arranged in an array along a variable vertical section of said first shelf supporting means and said variable vertical section having an upper and lower boundary;
   (b) utilizing a plurality of shelves supported on a second shelf supporting means with some of said shelves being arranged in an array along a variable vertical section of said second shelf supporting means, said variable vertical section for said second shelf supporting means having an upper and lower boundary and said shelves arranged along the vertical section of said first supporting means being essentially at the same height as a respective one of said shelves arranged along the vertical section of said second shelf supporting means so as to provide respective pairs of component supporting shelves;
   (c) continuously feeding a plurality of components towards said first and second shelf supporting means such that each component is inserted onto, and supported by at least one of said respective pairs of component supporting shelves;
   (d) moving said first and second shelf supporting means such that each one of said respective pairs of component supporting shelves moves downwardly and maintains the supported components essentially parallel to one another;
   (e) releasing, by moving apart each shelf of said respective pairs of supporting component shelves, the supported components from each one of said respective pairs of component supporting shelves when a respective pair of component supporting shelves reaches the lower boundary of each of said variable vertical sections and, at the upper boundary of each of said variable vertical section, moving together a shelf supported by said first shelf supporting means and a shelf supported by said second shelf supporting means to provide a replacement pair of component supporting shelves;
   (f) positioning a supporting table below the lower boundary of each of said variable vertical sections for supporting one or more of said released components and said supporting table being vertically adjustable so as to keep said table below said lower boundaries;
   (g) sensing the number of components supported by said table and, when the sensed number of components reaches a predetermined value, further lowering said table and moving said table and stacked components from below the lower boundary of each of said variable vertical section;
   (h) increasing the total number of shelves arranged along the vertical array of shelves of each of said variable vertical sections by lowering the position of the lower boundary of each of said variable vertical sections while said table is removed from under said variable vertical sections;
   (i) placing said table or another table below the lower boundary of each of said variable vertical sections;
   (j) raising the lower boundary of each of said variable vertical section so as to assist in the release of supported components from said respective pairs of component supporting shelves.

* * * * *

UNITED STATES PATENT AND TRADEMARK OFFICE
CERTIFICATE OF CORRECTION

PATENT NO.   :   4,867,626
DATED        :   September 19, 1989
INVENTOR(S)  :   Bhushan K. Oberoi It is certified that error appears in the above-identified patent and that said Letters Patent is hereby corrected as shown below:

On the cover sheet, the assignee name should read:

-- REDLAND ROOF TILES LIMITED --.

Signed and Sealed this

Twenty-third Day of October, 1990

*Attest:*

HARRY F. MANBECK, JR.

*Attesting Officer*      *Commissioner of Patents and Trademarks*